UNITED STATES PATENT OFFICE.

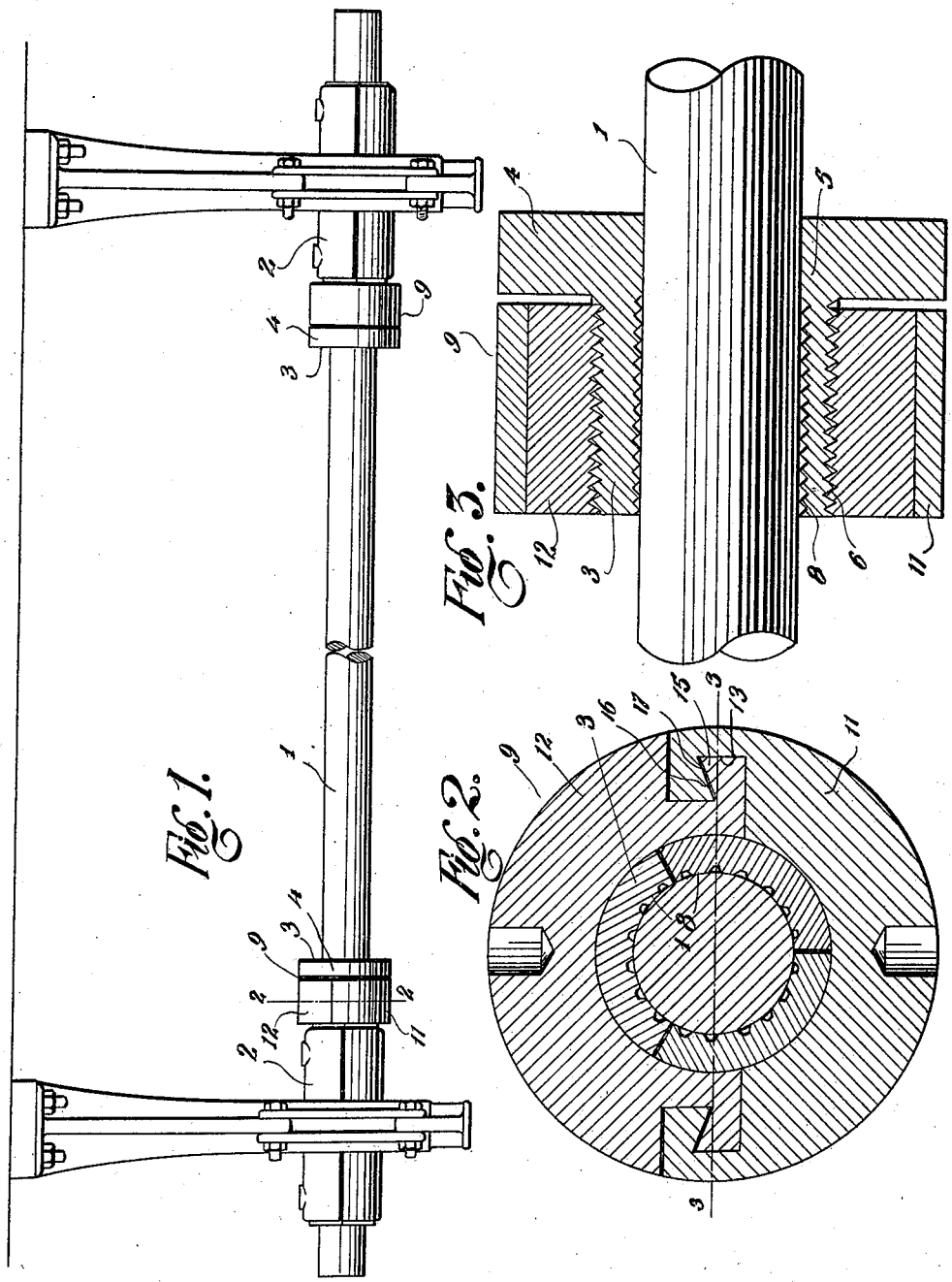

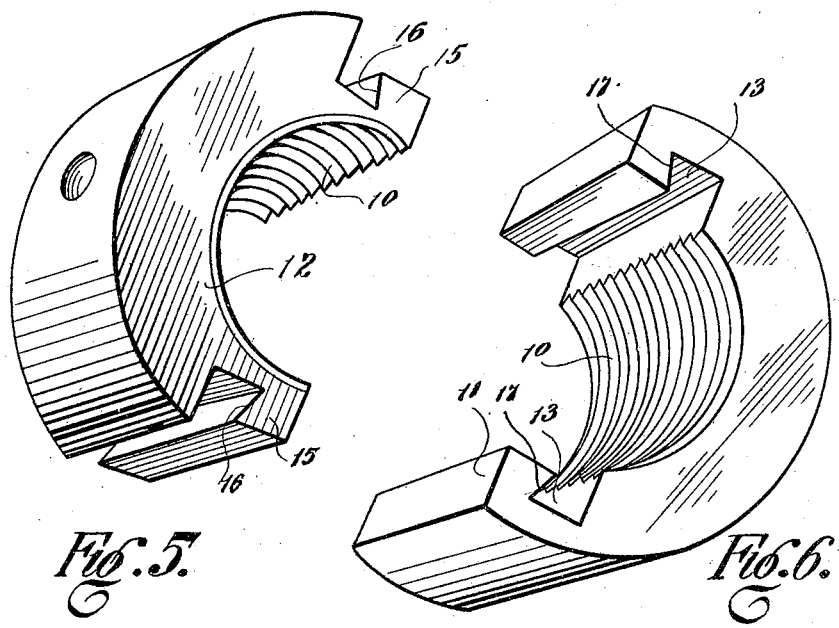
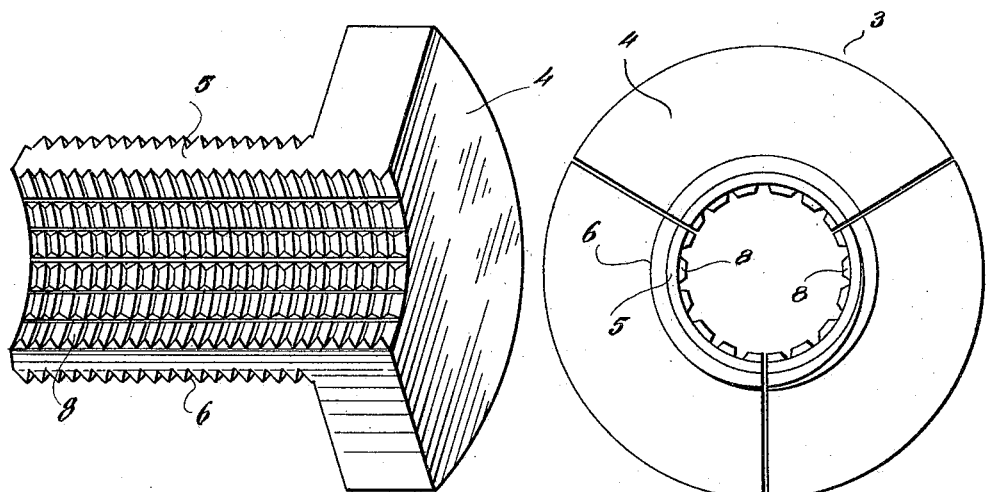

GEORGE F. SHAFFER, OF YORK HAVEN, PENNSYLVANIA.

SHAFT COLLAR.

1,405,342.

Specification of Letters Patent. Patented Jan. 31, 1922.

Application filed July 20, 1920. Serial No. 397,627.

*To all whom it may concern:*

Be it known that I, GEORGE F. SHAFFER, a citizen of the United States, residing at York Haven, in the county of York and State of Pennsylvania, have invented new and useful Improvements in Shaft Collars, of which the following is a specification.

My present invention has reference to a means for applying a collar to a shaft which is already journaled in upright supports or hangers without necessitating the removal of the shaft from its supports.

In carrying out my invention it is my purpose to produce a flanged sleeve having inner binding elements and outer threads, and which is constructed of sections whereby the same may be readily arranged around a shaft, and to also provide a sectional collar that may be also arranged around the shaft, the sections of the said collar having their confronting edges provided with co-engaging means and the collar having its bore threaded to permit the same to be screwed over the sleeve, and thus bind the sleeve against the shaft.

The drawings illustrate a satisfactory embodiment of the improvement reduced to practice, and in which:—

Figure 1 is an elevation of a collar or abutment element in accordance with this invention and in applied position.

Figure 2 is a sectional view approximately on the line 2—2 of Figure 1, and on an enlarged scale.

Figure 3 is a sectional view approximately on the line 3—3 of Figure 2.

Figure 4 is a perspective view looking toward the inner face of one of the sleeve sections.

Figure 5 is a perspective view of one of the collar sections.

Figure 6 is a similar view of the cooperating collar section.

Figure 7 is an end view of the sleeve looking toward the threaded or socket end thereof, and the sections assembled.

In the drawings, the numeral 1 designates a shaft, and 2 the supports on which the shaft is journaled.

My improvement is designed either to prevent longitudinal movement of the shaft through its bearings, or to provide abutment or contact members for elements, such as wheels or the like which are positioned on the shaft. Of course, such wheels or pulleys may be of sectional construction, having their hubs provided with coengaging means for holding the sections assembled and in proper alignment.

Strictly speaking, my improvement contemplates the employment of a male and a female member, both of which, when assembled provide the collar or abutment, but for the sake of convenience, I will hereinafter refer to one of the members as a sleeve and the other member as a collar.

The sleeve is broadly indicated by the numeral 3, and has one of its ends provided with an outturned flange 4. The body of the sleeve, indicated by the numeral 5 preferably has its bore slightly flared and its outer face or periphery also slightly flared from the flange to the end thereof. The outer periphery of the sleeve is threaded, as indicated by the numeral 6, and the bore of the said sleeve is provided with substantially rectangular teeth 8 which are designed to grip the shaft, when the sleeve is arranged on the shaft. If desired, the sleeve may be constructed of comparatively soft metal, and the said sleeves comprises a plurality of sections, three being illustrated by the drawings.

It will be noted that the sections of the sleeve may be readily arranged around the shaft and held properly positioned thereon by the person attaching the device to the shaft. The sleeve is engaged by the female member, which I have referred to as the collar. The collar is broadly indicated by the numeral 9. The collar has its bore tapered from one of its ends to its other end and its said bore is threaded, as at 10, to engage with the threaded extension or body portion of the sleeve 5. The collar 10 comprises two sections 11 and 12 respectively, and these sections may be readily arranged around the shaft. The section 11 has its threaded bore of a less diameter than the threaded bore of the section 12, and from the terminal of the threads the said section, on its inner face is formed with longitudinal grooves 13 and reduced straight shoulders at the outer ends of the grooves. The section 12, has its outer face, at its ends reduced, and the said reduced portion, at the ends of the said section is formed with outwardly projecting portions forming tongues 15. The inner walls of the tongues are arranged at an angle, as indicated by the numeral 16, and the said tongues are substantially wedge shaped, being slightly tapered from one end of the section 12 to the other end thereof. The outer walls of the grooves 13 are cut at an outward angle as indicated by the numeral 17, and these walls are also slightly tapered from one end thereof to the other. When the sections 11 and 12 are arranged over the shaft they are brought together so that the tongues 15 of the section 12 are received in the grooves 13 of the section 11. The collar, thus assembled, is now screwed onto the threaded portion of the sleeve 5, and incident to the tapered or threaded bore of the collar and the tapered threaded portion of the sleeve, the sections of the latter will be compressed against the shaft so that the teeth 8 of the said sections will bind against the said shaft. Because of the tapered coengaging means between the collar sections, the section 11 is prevented from moving longitudinally, in an outward direction over the section 12.

It is thought that the foregoing description, when taken in connection with the drawings will fully set forth the advantages of the construction, the manner in which it is applied to the shaft as well as the simplicity and efficiency of the improvement.

Having thus described the invention, what I claim is:—

A stop or abutment member for a supported shaft, comprising a tapered flanged sleeve of comparatively soft metal having its bore provided with transversely arranged substantially rectangular teeth arranged in longitudinal series, and its periphery threaded, said sleeve constituting a plurality of sections adapted to be arranged around the shaft, and a collar having a tapered threaded bore to engage with the threaded sleeve, said collar comprising a plurality of sections whereby the same may be arranged around the shaft, one of the sections having tapered tongues, the other section having tapered grooves to receive the tongues, and said collar when screwed on the sleeve designed to compress the sections of the latter and the teeth substantially V-shaped in cross section thereon against the shaft, whereby to lock the sleeve and collar on the shaft.

In testimony whereof I affix my signature.

GEORGE F. SHAFFER.